United States Patent [19]
Reed

[11] 4,308,747
[45] Jan. 5, 1982

[54] APPARATUS FOR MARKING RADIAL FIRST HARMONIC HIGH POINT ON A TIRE

[75] Inventor: Eugene L. Reed, Tuscaloosa, Ala.

[73] Assignee: The B. F. Goodrich Company, New York, N.Y.

[21] Appl. No.: 134,644

[22] Filed: Mar. 27, 1980

[51] Int. Cl.³ ............................................ G01M 17/02
[52] U.S. Cl. ..................................................... 73/146
[58] Field of Search ................. 73/146, 460, 461, 462

[56] References Cited

U.S. PATENT DOCUMENTS 3,518,878 7/1970 Landsness et al. ..................... 73/146
4,198,858 4/1980 Farmer et al. ......................... 73/146

Primary Examiner—Jerry W. Myracle

Attorney, Agent, or Firm—Woodford R. Thompson, Jr.

[57] ABSTRACT

The radial first harmonic high point on a tire is marked as the tire is rotated on a uniformity machine having a sensor for sensing the high point. A tubular housing carried by a rotatable shaft receives a marking fluid which is dispensed at the lower end thereof by a spring loaded ball that is depressed by contact with the tire sidewall. The shaft is rotated to move the ball into contact with the tire in response to the sensor sensing the radial first harmonic high point on the tire with rotation of the shaft being synchronized with movement of the tire so that the radial first harmonic high point of the tire corresponds with the point of contact with the ball with the tire.

2 Claims, 5 Drawing Figures

APPARATUS FOR MARKING RADIAL FIRST HARMONIC HIGH POINT ON A TIRE

BACKGROUND OF THE INVENTION

This invention relates to apparatus for marking the radial first harmonic high point on a tire which may be defined as the highest area of force on a once-per-revolution force curve of a tire.

As is well known in the art to which my invention relates, a tire is an assembly of many components which may individually or collectively create a high force area which may be felt in a vehicle, such as an automobile. This high force area is determined and identified by the uniformity machine in a conventional manner. Heretofore, the high force area has been marked by spraying a marking fluid, such as ink, onto the tire as it rotates on the uniformity machine. This high point mark is then used in a rim-tire match mounting operation so that the assembly produces the best combination of ride characteristics when the tire is mounted on a vehicle, such as an automobile. That is, the high point mark on the tire is matched with the low point on the rim, which is usually identified by the location of the valve stem opening in the rim. Accordingly, by this match mounting operation, better concentricity is obtained.

Difficulties have been encountered with prior methods of marking the radial first harmonic high point on tires due to the fact that the spray apparatus heretofore employed does not produce a clear predictable mark which is neat in appearance. That is, where the marking fluid, such as point or ink is thrown onto the tire by spray apparatus, the marking fluid is spattered onto the tire in such a manner that a clear mark is not obtained. Such spray apparatus for applying the marking fluid is also very difficult to maintain in satisfactory working order due to the fact that the spray apparatus soon becomes clogged and must be disassembled for cleaning.

SUMMARY OF THE INVENTION

In accordance with my invention, I overcome the above and other difficulties by providing apparatus which marks the radial first harmonic high point on a tire as the tire is rotated on a uniformity machine having a sensor which identifies the high point in the usual manner. A rotatable shaft supports a depending tubular housing which receives a marking fluid from a reservoir therefor. The marking fluid is dispensed at the lower end of the tubular housing by a spring loaded ball which is depressed by contact with the tire sidewall adjacent thereto. The shaft is rotated to move the ball into contact with the adjacent sidewall of the tire in response to the sensor identifying the radial first harmonic high point on the tire with the rotation of the shaft being synchronized with the movement of the tire whereby the radial first harmonic high point of the tire corresponds with the point of contact of the ball with the tire. Accordingly, my improved apparatus produces a mark which is clear, looks good and is predictable. Also, the mark is dry almost immediately and well before leaving the uniformity machine, thus preventing transfer or smearing. Furthermore, repeatability and accuracy is good due to the fact that the marking fluid is not thrown onto or splattered onto the tire. A still further advantage in my improved apparatus is that my apparatus requires a minimum of maintenance since the apparatus is self-cleaning and requires a minimum of time to assemble and disassemble.

DESCRIPTION OF THE DRAWINGS

Apparatus embodying features of my invention is illustrated in the accompanying drawings, forming a part of this application, in which.

DETAILED DESCRIPTION

Figure 1:
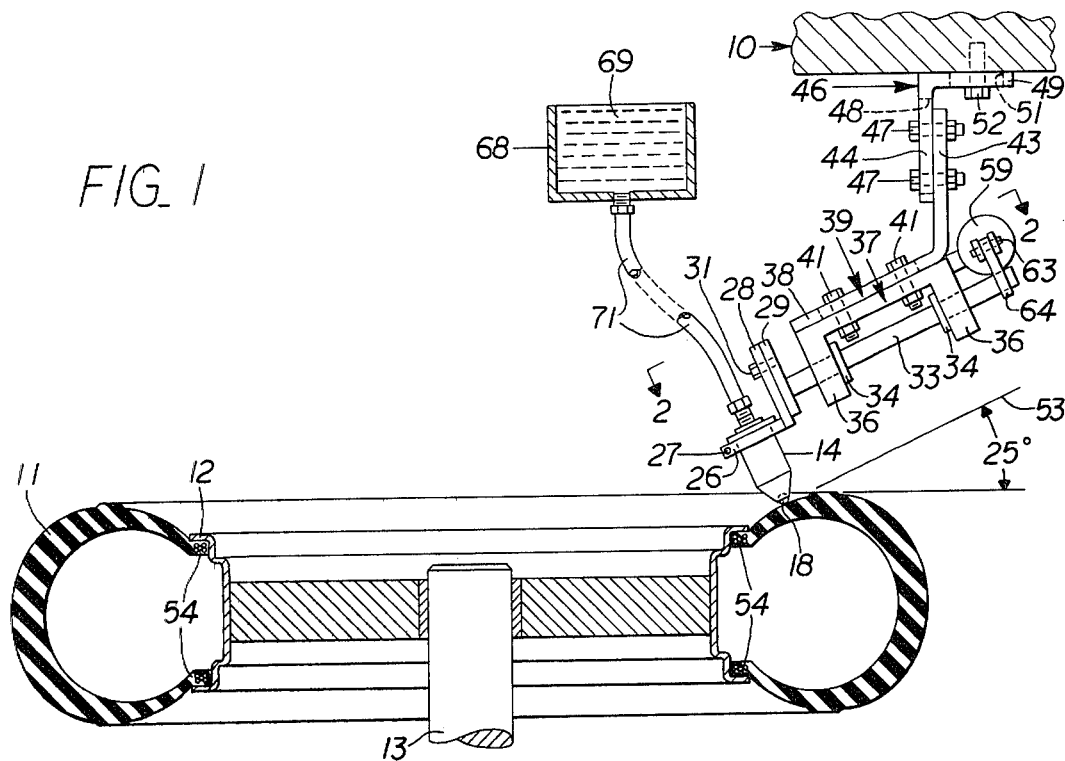
FIG. 1 is a vertical sectional view through a pneumatic tire mounted for rotation in a horizontal plane in a conventional type uniformity machine with my improved apparatus being shown in elevation.

Referring now to the drawings for a better understanding of my invention, I show in FIG. 1 a fragment 10 of a conventional type uniformity machine which is adapted to support a pneumatic tire 11 for rotation in a horizontal plane. The tire 11 is mounted on a rim support 12 which in turn is carried by a rotatable shaft 13. The uniformity machine 10 is provided with conventional means for sensing the radial first harmonic high point on a tire 11 as it is rotated on the uniformity machine. In view of the fact that the construction and operation of such uniformity machines, including the means for sensing the radial first harmonic high point, is well known in the art to which my invention relates, no further description thereof is deemed necessary. That is, my improved apparatus relates to the specific means for marking the radial first harmonic high point on the tire after the high point has been sensed by the uniformity machine in the usual manner.

Figure 5:
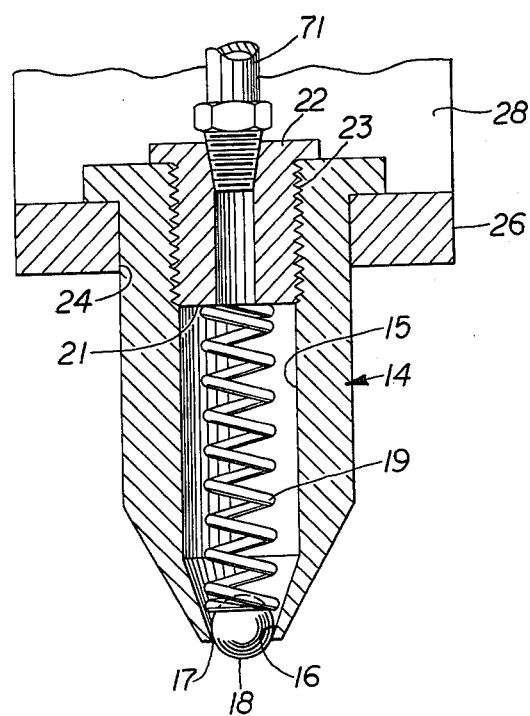

My improved apparatus includes a depending tubular housing 14 having an axially extending chamber 15 therein for receiving a suitable marking fluid, such as ink, paint or the like. A downwardly tapered, annular seat 16 is provided at the lower end of the chamber 15 with the annular seat 16 terminating in a centrally disposed discharge opening 17, as shown in FIG. 5. Supported for rotation within the annular seat 16 is a ball 18 having a lower portion thereof adapted to project below the discharge opening 17. The ball 18 is of a diameter greater than the internal diameter of the discharge opening 17 whereby the ball is adapted to move selectively in a downward direction toward the seat 16 to close the discharge opening 17 and upwardly away from the seat 16 to permit rotation of the ball 18 and open the discharge opening 17. Resilient means, such as a compression spring 19 engages the upper portion of the ball 18 and extends axially of the chamber 15 with the upper end of the spring 19 engaging a spring abutment 21 which is shown as being the under surface of a threaded member 22 which is in threaded engagement with threads 23 carried by the upper portion of the chamber 15, as shown in FIG. 5.

Figure 3:
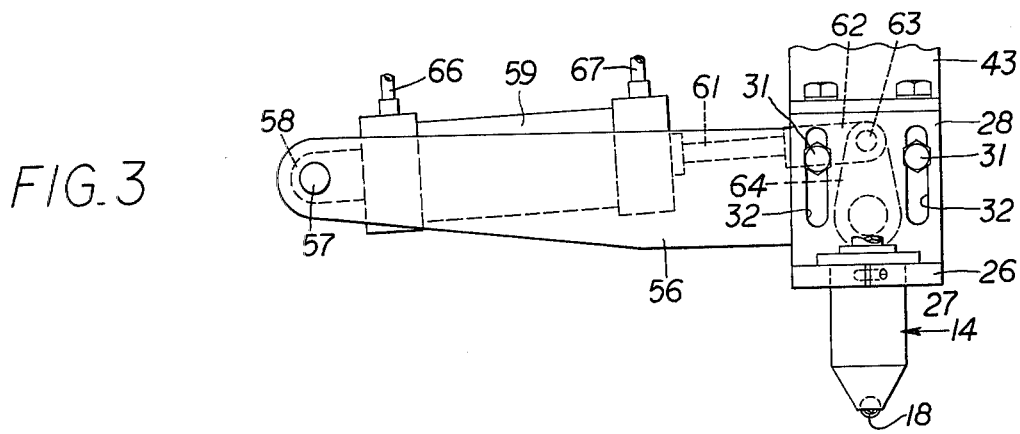
FIG. 3 is an enlarged side elevational view of my improved apparatus taken generally along the line 3—3 of FIG. 2 showing the position of the marking apparatus as the mark is applied to the tire.
Figure 4:
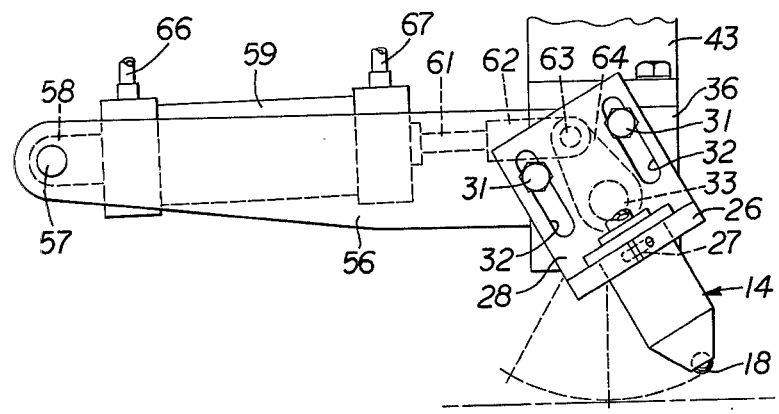
FIG. 4 is a side elevational view corresponding to FIG. 3 showing the marking apparatus in the inoperative position; and, FIG. 5 is an enlarged, fragmental sectional view taken generally along the line 5—5 of FIG. 2.

The tubular housing 14 extends downwardly through an opening 24 provided in a split collar 26 and is secured therein by a retaining screw 27. The split collar 26 is secured rigidly to an upstanding plate 28 by suitable means, such as by welding. The plate 28 is secured rigidly to an upstanding plate 29 by retaining bolts 31 which pass through upstanding, elongated slots 32 provided in the plate 28, as shown in FIGS. 3 and 4. Accordingly, the plate 28 is adapted for vertical adjustment relative to the plate 29 whereby the tubular housing 14 may be supported at selected elevations.

Figure 2:
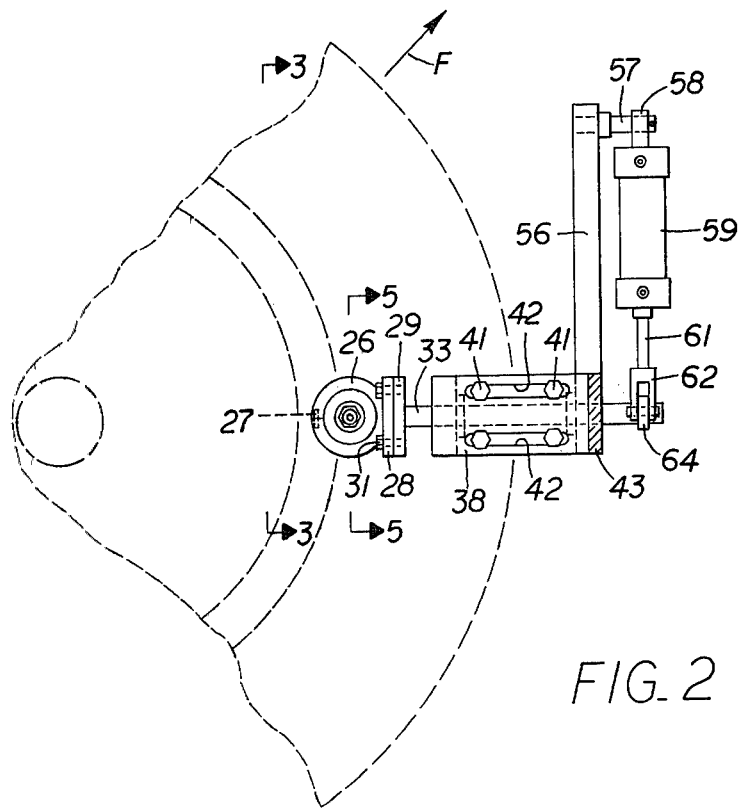
FIG. 2 is a fragmental view taken generally along the line 2—2 of FIG. 1.

The plate 29 is secured non-rotatably to a shaft 33 which is mounted for rotation in suitable bearings 34 carried by depending legs 36 of an inverted, U-shaped bracket 37, as shown in FIG. 1. The bracket 37 is adjustably connected to a downwardly inclined leg 38 of an angle bracket 39 by retaining bolts 41 which pass through elongated slots 42 provided in the angle bracket 39, as shown in FIG. 2. The angle bracket 39 is provided with a vertical leg 43 which is adjustably connected to a depending leg 44 of an angle bracket 46 by retaining bolts 47 which pass through elongated slots 48 provided in the leg 44. A horizontal leg 49 of the angle bracket 46 is provided with elongated slots 51 therein for receiving retaining bolts 52 which secure the angle bracket 46 to a stationary portion of the uniformity machine 10, as shown in FIG. 1. Accordingly, the position of the tubular housing 14 and the ball 18 may be adjusted to selected positions both radially and vertically relative to the tire 11. As shown in FIG. 1, the lower leg of the support bracket 39 is at an angle relative to the upstanding leg thereof to support the tubular housing 14 in position to swing in a plane which is perpendicular to the adjacent surface of the side wall of the tire 11 mounted on the rim 12. That is, the tubular housing 14 is supported at an angle approximately 25° from the vertical whereby it extends perpendicular to a plane 53 which extends parallel to the adjacent surface of the side wall which is nearest the bead 54 of the tire 11, as shown in FIG. 1. Preferably the depending housing 14 is positioned an angular distance of approximately 45° from the receiving end "F" of the uniformity machine, as viewed in the direction of rotation of the tire 11.

As shown in FIGS. 2, 3 and 4, an elongated support bracket 56 is secured rigidly at one end to the outermost depending leg 36 of the support bracket 37. The other end of the support bracket 56 extends outwardly in a direction generally perpendicular to the axis of rotation of the shaft 33, as shown in FIG. 2. A laterally extending support pin 57 is carried by the outer end of the bracket 56 and extends through an eye member 58 which is carried by one end of a pneumatic cylinder 59. A piston rod 61 extends from the other end of the cylinder 59 and is connected to a conventional type piston mounted for movement within the cylinder 59. A clevis 62 is carried by the free end of the piston rod 61 and is pivotally connected by a pivot pin 63 to the upper end of a crank arm 64. The other end of the crank arm 64 is secured rigidly to the shaft 33. Fluid under pressure, such as air, is introduced into and exhausted from the cylinder 59 by conduits 66 and 67. Also, a reservoir 68, supported at an elevation above the tubular housing 14, supplies a marking fluid 69 to the chamber 15 of the tubular housing 14 through a supply conduit 71, as shown in FIGS. 1 and 5.

As shown in FIG. 2, the shaft 33 is mounted for rotation about an axis which extends radially and upwardly above the tire 11 as it is rotated in a horizontal plane with the axis of the shaft 33 being generally parallel to the adjacent portion of the sidewall of the tire nearest the bead 54. Accordingly, upon rotation of the shaft 33, the housing 14 moves about the axis of rotation of the shaft 33 in a plane generally perpendicular to the adjacent portion of the sidewall of the tire 11 whereby the ball 18 carried by the tubular housing 14 is moved in a plane generally parallel to the direction of rotation of the adjacent portion of the tire 11.

From the foregoing description, the operation of my improved apparatus for marking the radial first harmonic high point on a tire will be readily understood. The tubular housing 14 is supported from the plates 28 and 29 and the support brackets 37, 39 and 46 whereby it is adapted to swing in a plane generally perpendicular to the subjacent portion of the sidewall of the tire 11, as shown in FIG. 1. In this position, the tubular housing 14 and the ball 18 carried thereby are adapted to swing in a plane which is generally parallel to the direction of movement of the subjacent portion of the tire 11.

Since one of the usual measurements of the uniformity machine is the high point of the radial first harmonic which is the highest area of force on a once-per-revolution force curve of a tire, the uniformity machine is provided with conventional sensor means for sensing this radial first harmonic high point. Actuator means in the form of a hydraulic cylinder 59, is actuated in response to the sensor means on the uniformity machine sensing the radial first harmonic high point on the tire being rotated with the movement of the actuator means 59 being synchronized with movement of the tire so that the radial first harmonic high point on the tire corresponds with the point of contact of the ball 18 with the tire 11. As the ball 18 moves from the position shown in FIG. 4 to the position shown in FIG. 3, it contacts the tire sidewall whereupon it is forced upwardly away from the seat 16 to thus dispense the marking fluid onto the tire sidewall upon rotation of the ball 18 in the seat 16. Since the tubular housing 14 carrying the ball 18 is actuated in response to the sensor sensing the radial first harmonic high point on the tire and rotation of the tubular housing 14 is synchronized with movement of the tire, the radial first harmonic high point of the tire corresponds with the point of contact of the ball 18 with the tire 11. Accordingly, a small, clear mark is applied to a specific area of the tire without splattering the marking fluid over any other areas of the tire.

From the foregoing it will be seen that I have devised improved apparatus for marking the radial first harmonic high point on a tire as it is rotated in a horizontal plane on a uniformity machine. By applying the marking fluid from the lower end of a tubular housing having a spring loaded ball therein, the ball is depressed by contact with the tire sidewall whereby a uniform and specific amount of the marking fluid is transferred onto the sidewall of the tire and at the same time the ball picks up an additional supply of the marking fluid which is supplied to the chamber 15 in the tubular housing 14. As the lower end of the tubular housing 14 carrying the ball 18 continues to rotate in a clockwise direction from the position shown in FIG. 3, the ball 18 moves upwardly out of contact with the adjacent sidewall of the tire 11 whereby the compression spring 19 urges the ball 18 downwardly into sealing engagement with the seat 16 to thus interrupt the flow of any marking fluid from the chamber 15.

By providing a ball for applying the high point mark to the tire, the mark is clear and does not mar the appearance of the tire and at the same time the mark will last through assembly due to the fact that it dries almost immediately and it is not thick enough to flake off. Also, by providing apparatus which is self-cleaning, a minimum of maintenance is required to maintain the apparatus in satisfactory working order at all times.

While I have shown my invention in but one form, it will be obvious to those skilled in the art that it is not so limited, but is susceptible of various changes and modifications without departing from the spirit thereof.

What I claim is:

1. In apparatus for marking the radial first harmonic high point on a tire as it is rotated in a horizontal plane on a uniformity machine having sensor means for sensing said radial first harmonic high point:
    (a) a depending tubular housing positioned an angular distance of approximately 45° from the receiving end of the uniformity machine as viewed in the direction of rotation of the tire and having a downwardly tapered annular seat at its lower end terminating in a centrally disposed dicharge opening,
    (b) a ball supported for rotation within said seat and having a lower portion projecting below said discharge opening with said ball being adapted to move selectively toward said seat to close said discharge opening and away from said seat to open said discharge opening,
    (c) resilient means within said housing urging said ball toward said seat,
    (d) means supplying a marking fluid to said tubular housing,
    (e) a shaft supporting said tubular housing above said tire being rotated for travel in a direction to move said ball carried thereby toward and away from said tire with said ball contacting said tire upon movement of said ball toward said tire so that said ball is moved away from said seat to apply said marking fluid onto said tire with said shaft being mounted for rotation about an axis extending radially and upwardly above said tire as it is rotated in a horizontal plane with said axis extending generally parallel to an adjacent portion of the sidewall of said tire and said tubular housing extending at an angle approximately 25° from the vertical in position to move about said axis in a plane generally perpendicular to said adjacent portion of said sidewall whereby said ball carried by said tubular housing is moved in a plane generally parallel to the direction of rotation of said adjacent portion of said tire, and
    (f) actuator means operatively connected to said shaft for moving said tubular housing toward said tire in response to said sensor means sensing said radial first harmonic high point on said tire being rotated with movement of said actuator means being synchronized with movement of said tire so that said radial first harmonic high point on said tire corresponds with the point of contact of said ball with said tire.

2. Apparatus as defined in claim 1 in which said shaft is carried by a support bracket which is adjustably connected to the uniformity machine for radial and vertical adjustment relative thereto.

* * * * *